US008706655B1

(12) United States Patent
Rangarajan et al.

(10) Patent No.: US 8,706,655 B1
(45) Date of Patent: Apr. 22, 2014

(54) MACHINE LEARNED CLASSIFIERS FOR RATING THE CONTENT QUALITY IN VIDEOS USING PANELS OF HUMAN VIEWERS

(75) Inventors: Anand Rangarajan, Santa Clara, CA (US); Charles DuHadway, Sunnyvale, CA (US); Hrishikesh Balkrishna Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 382 days.

(21) Appl. No.: 13/152,978

(22) Filed: Jun. 3, 2011

(51) Int. Cl.
*G06F 15/18* (2006.01)
(52) U.S. Cl.
USPC .......................................................... 706/12
(58) Field of Classification Search
USPC ...................................................... 706/12, 45
See application file for complete search history.

(56) References Cited

U.S. PATENT DOCUMENTS

| | | | | |
|---|---|---|---|---|
| 8,311,344 | B2 * | 11/2012 | Dunlop et al. | 382/224 |
| 8,396,286 | B1 * | 3/2013 | Aradhye et al. | 382/159 |
| 8,452,778 | B1 * | 5/2013 | Song et al. | 707/748 |
| 2008/0133346 | A1 * | 6/2008 | Chow et al. | 705/14 |
| 2008/0134043 | A1 * | 6/2008 | Georgis et al. | 715/733 |
| 2008/0228749 | A1 * | 9/2008 | Brown | 707/5 |
| 2010/0076923 | A1 * | 3/2010 | Hua et al. | 706/61 |
| 2010/0082614 | A1 * | 4/2010 | Yang et al. | 707/726 |
| 2011/0239137 | A1 * | 9/2011 | Bill | 715/757 |

OTHER PUBLICATIONS

Song, Y., Zhao, M., Yagnik, J., & Wu, X. (Jun. 2010). Taxonomic classification for web-based videos. In Computer Vision and Pattern Recognition (CVPR), 2010 IEEE Conference on (pp. 871-878).*
Wang, Z., Zhao, M., Song, Y., Kumar, S., & Li, B. (Jun. 2010). Youtubecat: Learning to categorize wild web videos. In Computer Vision and Pattern Recognition (CVPR), 2010 IEEE Conference on (pp. 879-886).*
Yan, R., & Naphade, M. (Jun. 2005). Semi-supervised cross feature learning for semantic concept detection in videos. In Computer Vision and Pattern Recognition, 2005. CVPR 2005. IEEE Computer Society Conference on (vol. 1, pp. 657-663).*

(Continued)

*Primary Examiner* — David Vincent
(74) *Attorney, Agent, or Firm* — Fenwick & West LLP (57) ABSTRACT

A multi-phase process first trains a machine learned rating classifier, and then uses the rating classifier to automatically rate videos in a selected category in a way which mimics human rating. Panels of human viewers rate videos in tuples, and these tuples along with human preference data distilled from the ratings are used to create a training set that is used to train the machine learned rating classifier. The rating classifier becomes capable of predicting human preferences with regards to videos in the selected category. Optionally a second machine learned classifier can be trained to automatically identify videos in the selected category for the panels of human viewers to rate. The output of the multi-phase process can be used to highlight content that is predicted to be higher quality.

36 Claims, 5 Drawing Sheets

(56) References Cited

OTHER PUBLICATIONS

Aradhye, H., et al., "Video2Text: Learning to Annotate Video Content", *ICDM Workshop on Internet Multimedia Mining*, 2009, pp. 144-151.

Freund, Y., et al., "An Efficient Boosting Algorithm for Combining Preferences," Journal of Machine Learning Research, Nov. 2003, pp. 933-969, vol. 4.

Grangier, B., et al., "A Discriminative Kernel-based Model to Rank Images from Text Queries," IEEE Transactions on Pattern Analysis, Aug. 2008, pp. 1371-1384, vol. 30, No. 8.

Herbrich, R., et al., "Large Margin Rank Boundaries for Ordinal Regression," Advances in Large Margin Classifiers, 2000, pp. 116-132, The MIT Press.

Xu, L., et al., "AdaRank: A Boosting Algorithm for Information Retrieval", SIGIR 2007 Proceedings, Session 16: Learning to Rank II, 2007, pp. 391-398.

\* cited by examiner

MACHINE LEARNED CLASSIFIERS FOR RATING THE CONTENT QUALITY IN VIDEOS USING PANELS OF HUMAN VIEWERS

BACKGROUND

1. Field of Art

The present disclosure relates to the field of digital video and audio, and more specifically, to training and using machine learned classifiers for assessing the quality of content in videos.

2. Background

As video hosting services such as YOUTUBE™ have gained popularity, they have become an important new entertainment platform. Viewers go to video hosting websites to enjoy a variety of content, such as musical performance, stand-up comedy routines, technical demonstrations and instructions, educational presentations, and many other types of content.

The process for discovering high quality content on video hosting websites is sub-optimal for both viewers and content owners seeking an audience. There are currently millions of videos uploaded to video hosting websites, and the inventory of content grows daily. In this crowded space it is difficult for content owners to establish a presence, even if the content they post is of high quality. In order for high quality content to be noticed by the public it must be differentiated from the innumerable other videos that are uploaded. While content owners can tag videos with text descriptors such as "music," "comedy," and "prank," this type of tagging is not sufficient because it simply identifies the category of video, but does not distinguish between good content and bad content. Where content providers do tag videos with qualitative tags—e.g., "awesome," "amazing content," or "funniest ever"—these tags are typically self-serving, and cannot be trusted as accurately representing the quality of the content in the video.

Since most video hosting services promote the videos with the most views, a content owner with high-quality content can sometimes distinguish her videos from others in a crowded category just by gaining a large viewership. Viewership, however, is not perfectly correlated with content quality. The number of viewers that watch a given video is often a function of the number of existing viewers that the video already has; users tend to watch the most popular videos because these popular videos tend to be included in lists of suggested videos, primarily because of their view counts. This creates a feedback loop where the popular videos become even more popular, even if they are not necessarily the highest quality content available.

SUMMARY

A supervised learning system is trained to rate or score videos for their content quality, based on ratings provided by human viewers viewing a sample set of videos containing similar content. The videos are presented in unordered sets of 2 or more videos, hereinafter referred to as "tuples," to panels of human viewers, thus forming n-wise comparisons. The ratings are votes, numerical scoring, or other rating information about the videos in each tuple, representing the viewers' preferences based on the content quality in the videos. Preferably, the videos in the tuples are all from a common category of videos (e.g., all comedy routines, or all cover songs, etc.) so that the viewers are comparing similar types of content.

From the ratings, an ordering of the videos in each tuple can be determined, and the most preferred videos identified in each tuple. In one embodiment, human viewers select from presented pairs (2-tuples) of videos the video in each pair that is considered the best content, thus ordering the videos in each pair. Alternatively, in tuples of more than 2 videos, the viewers can provide a score to each video in the tuple, in which case the videos are ordered according to their total individual scores. A training set of videos is created from the ordered tuples. The system uses the content features of the training set to train a supervised learning model, herein called a "rating classifier." The rating classifier essentially learns which content features of the videos are associated with the preferred (i.e., higher content quality) videos.

After the system is trained, it can be used to automatically rate or score other videos in the same category as those on which the system was trained. These scores can then be used as a measure of the content quality of the videos. The scores can also be used to rank the videos and the ranked videos can then be presented to viewers, for example as playlists, or for further rating and ranking.

In one embodiment, a supervised learning system includes a video identification module, a human rating module, and a scoring module. In the video identification module, a number of videos of a selected category are gathered into a set. This set can be assembled in different ways including by way of a search engine, human collection or automatically through a machine learned classifier.

In the human rating module, multiple panels of human raters watch selected tuples (e.g., pairs) of videos from a set of videos of the selected category, and rate the videos in each tuple. The ratings of the videos in each tuple are used to identify one or more preferred videos in that tuple. The human rating module then outputs the video tuples along with preference data that indicates the videos in each tuple that were preferred by the human panels. For example, one thousand panels of three human viewers each can be provided with selected pairs of videos. Each human member of the panels indicates which video, in the pair their panel viewed, they think is the best content, and the video that gets the majority of its panel's votes is designated the preferred video of that pair. In this example, the output of this module is a set of video pairs, each pair identifying the video in that pair that was considered better by a human panel.

In a scoring module, these video tuples (the above example used pairs) and the associated human preference data are used as a training set to train a supervised learning algorithm, which serves as the rating classifier. The rating classifier learns the content features from each tuple of videos that are correlated positively or negatively with human preference, and thus becomes capable of rating or scoring videos of the selected category in a manner that correlates with the human preferences expressed in the rating module.

One or more unrated videos in the selected category can then be submitted to the trained machine learned rating classifier. This rating classifier operates on the features of each submitted video to automatically produce a score. These scores are correlated with the preferences exhibited by the human raters in the human rating module. The scores can be used to identify high quality videos in the selected category and these videos can then be made available to viewers in a readily accessible manner, such as a playlist. In this way the videos that would most likely be judged by humans to be higher quality are automatically identified and made available to viewers.

Embodiments of the disclosure include computer implemented systems, methods, and computer program products for training a supervised learning system using human-rated videos, and computer implemented systems, methods and computer program products for using a trained supervised learning system to automatically score or rate videos.

DETAILED DESCRIPTION

System Architecture

Figure 1:
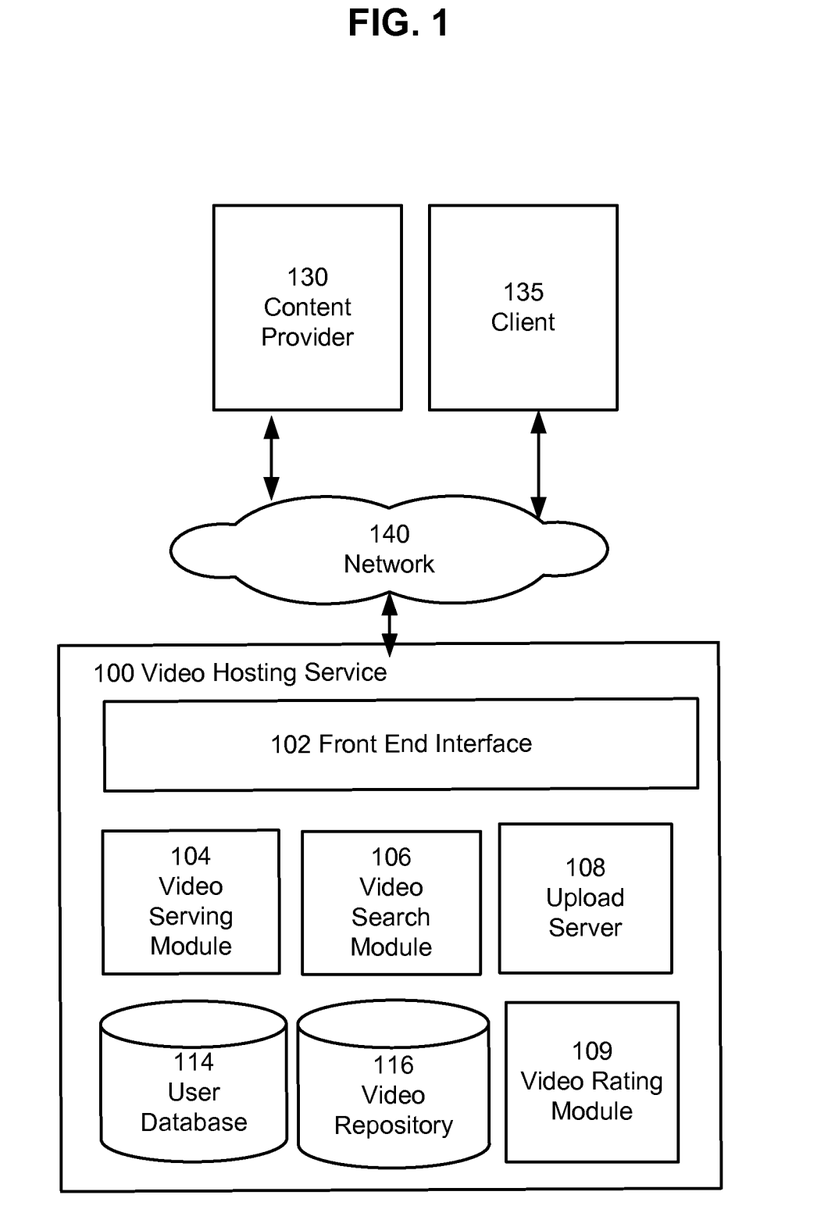
FIG. 1 is a block diagram of a video hosting service in which automatic video rating can be employed, according to one embodiment.

FIG. 1 is a block diagram of a video hosting service 100 in which automatic rating of videos can be employed, according to one embodiment. The video hosting service 100 represents a system such as that of YOUTUBE™ that stores and provides videos to clients such as the client device 135. The video hosting service 100 communicates with a plurality of content providers 130 and client devices 135 via a network 140 to facilitate sharing of video content between users. Note that in FIG. 1, for the sake of clarity, only one instance of content provider 130 and client 135 is shown, though there could be any number of each.

The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting service 100.

The video hosting service 100 can be accessed through various means. A suitable website for implementation of the video hosting service 100 is the YOUTUBE™ website, found at www.youtube.com; other video hosting sites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together. The service 100 can be accessed through appropriate application programming interfaces, and thus is not limited to use in websites only.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a smart phone, a laptop computer, or other type of network-capable device such as a networked television or set-top box.

The network 140 is typically the Internet, but may be any network, including but not limited to a LAN, a MAN, a WAN, a mobile wired or wireless network, a private network, or a virtual private network.

Conceptually, the content provider 130 provides video content to the video hosting service 100 and the client 135 views that content. In practice, content providers may also be content viewers. Additionally, the content provider 130 may be the same entity that operates the video hosting service 100.

The content provider 130 operates a client device to perform various content provider functions. Content provider functions may include, for example, uploading a video file to the video hosting service 100, editing a video file stored by the video hosting service 100, or editing content provider preferences associated with a video file.

The client 135 operates on a device to view video content stored by the video hosting service 100. Client 135 may also be used to configure viewer preferences related to video content. In some embodiments, the client 135 includes an embedded video player. The video player includes any application that is adapted for playing and browsing videos stored on the video hosting service 100. The player can be adapted to play videos in various formats, such as Adobe Flash™, WebM, H.264, DivX, FFMPEG, and the like. In one embodiment the video player may be a standalone program that is specifically dedicated for video playback, e.g. an application or app for Android, iOS, Windows Mobile, OS X, Windows 7 or any other mobile, tablet or PC operating system. In another embodiment the video player may be built directly into an operating system or embedded system. In other embodiments, the video player is a plug-in or add-on to, or is built into a web browser that allows users of client 135 to access web pages on the World Wide Web. Suitable web browsers include Microsoft Internet Explorer, Google Chrome, Mozilla Firefox, Apple Safari or any application adapted to allow access to web pages on the World Wide Web.

The upload server 108 of the video hosting service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting service 100.

In some embodiments, the user database 114 is responsible for maintaining a record of all registered users of the video hosting service 100. Registered users include content providers 130 and/or users who simply view videos on the video hosting service 100. Each content provider 130 and/or individual user registers account information including login name, electronic mail (e-mail) address and password with the video hosting server 100, and is provided with a unique user ID. The user ID can be based on any identifying information, such as the user's IP address, user name, or the like. This account information is stored in the user database 114.

The video repository 116 stores a set of videos submitted by users. The video repository 116 can contain any number of videos, such as tens of thousands or hundreds of millions. Each of the videos has a unique video identifier that distinguishes it from each of the other videos, such as a textual name (e.g., the string "a91qrx8"), an integer, or any other way of uniquely naming a video. The videos can be packaged in various containers such as AVI, MP4, or MOV, and can be encoded using video codecs such as MPEG-2, MPEG-4, H.264, and the like. In addition to their audiovisual content, the videos further have associated metadata, e.g., textual metadata such as a title, description, user comments, and/or user tags.

The video rating module 109 can identify content of a selected category in the video repository 116, and score those videos in the repository in accordance with human preference. The generated scores can be used as a measure of the quality of the scored videos.

Video Rating Module

Figure 2:
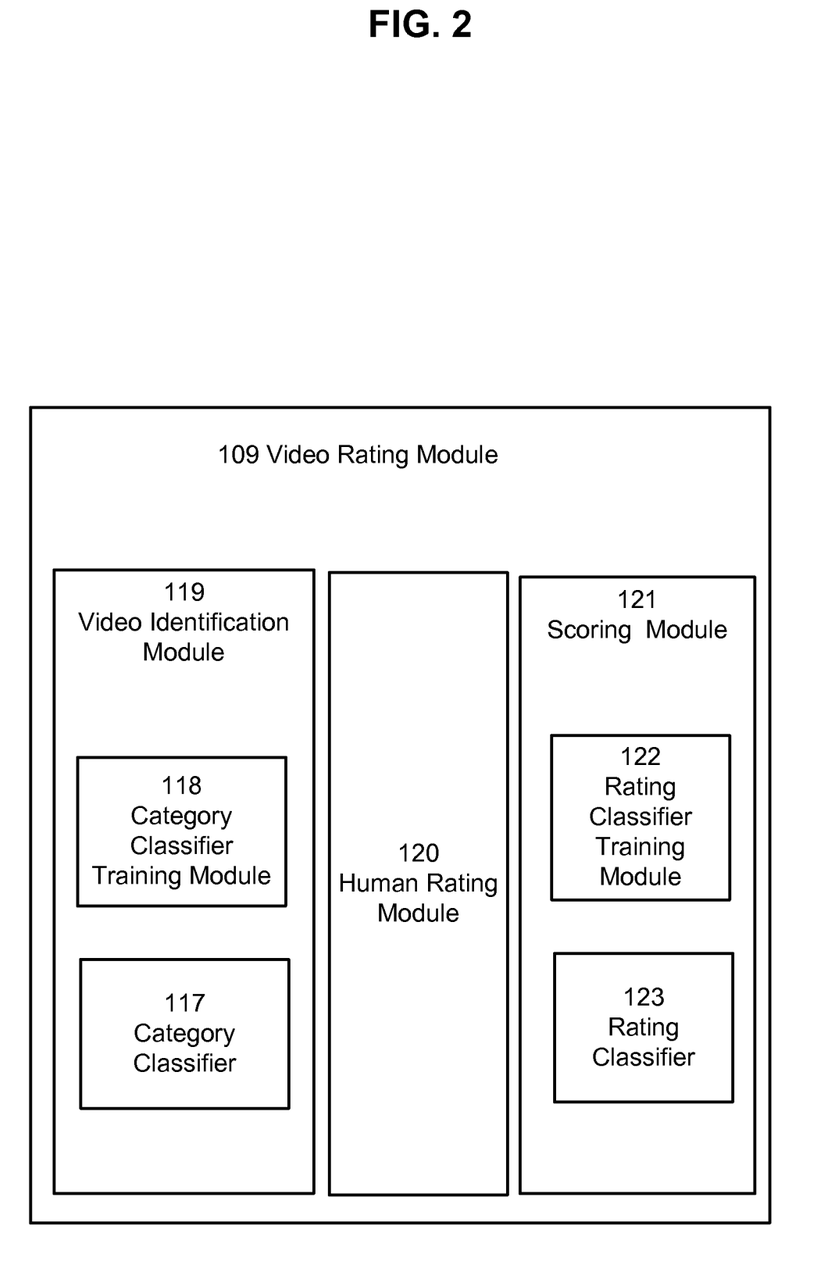
FIG. 2 illustrates the various components of a video rating module used in the video hosting service, according to one embodiment.

FIG. 2 shows one embodiment of the video rating module 109. The module 109 is configured to train a machine learned classifier based on human-provided ratings of videos, thereby learning the preferences of human viewers in regards to the quality of content in videos. The machine learned classifier can be based on a supervised or unsupervised learning algorithm. The module 109 is further configured to use the classifier to determine a rating or score for a given video, and optionally rank the given video in a set of videos ranked by score. For purposes of convenience, the machine learned classifier used by the rating module will sometimes be referred to as the "rating classifier". The illustrated embodiment of the video rating module 109 comprises a video identification module 119, a category classifier 117, a category classifier training module 118, a human rating module 120, a scoring module 121, a rating classifier training module 122 and a rating classifier 123.

Video Identification Module

The video identification module 119 is configured to identify videos belonging to a selected category, from the video repository 116 that contains many categories of videos, and is one means for performing this function. Video identification module 119 can provide identification functionality in various ways.

In one embodiment the identification of videos in a category is done by way of a machine learned classifier 117, which is trained by category classifier training module 118. The trained machine learned classifier can be used to distinguish videos containing content of a given category from videos containing other content. For purposes of convenience, this machine learned classifier will sometimes be referred to as a "category classifier". An implementation of one embodiment of such a machine learned classifier see Video2Text ("Video2Text: Learning to Annotate Video Content", Hrishikesh Aradhye, George Toderici, Jay Yagnik, *ICDM Workshop on Internet Multimedia Mining,* 2009).

In one embodiment video identification module 119 identifies videos of a selected category through the use of human curators. The curators review videos in the repository 116 and manually tag them with category labels, keywords and the like. The videos are then indexed by their tags. The module 119 can then receive a tag, and select from the repository 116 all of the videos matching the input tag.

In another embodiment the module 119 identifies videos of a given category through the use of search engines. Here, given a keyword or a category term, the module 119 passes the term to a search engine. The search engine returns a set of search results responsive to the category term, the search results including videos associated with the category. These videos (or a subset thereof) may be used as the video for the given category.

Category Classifier Training Process

Figure 3:
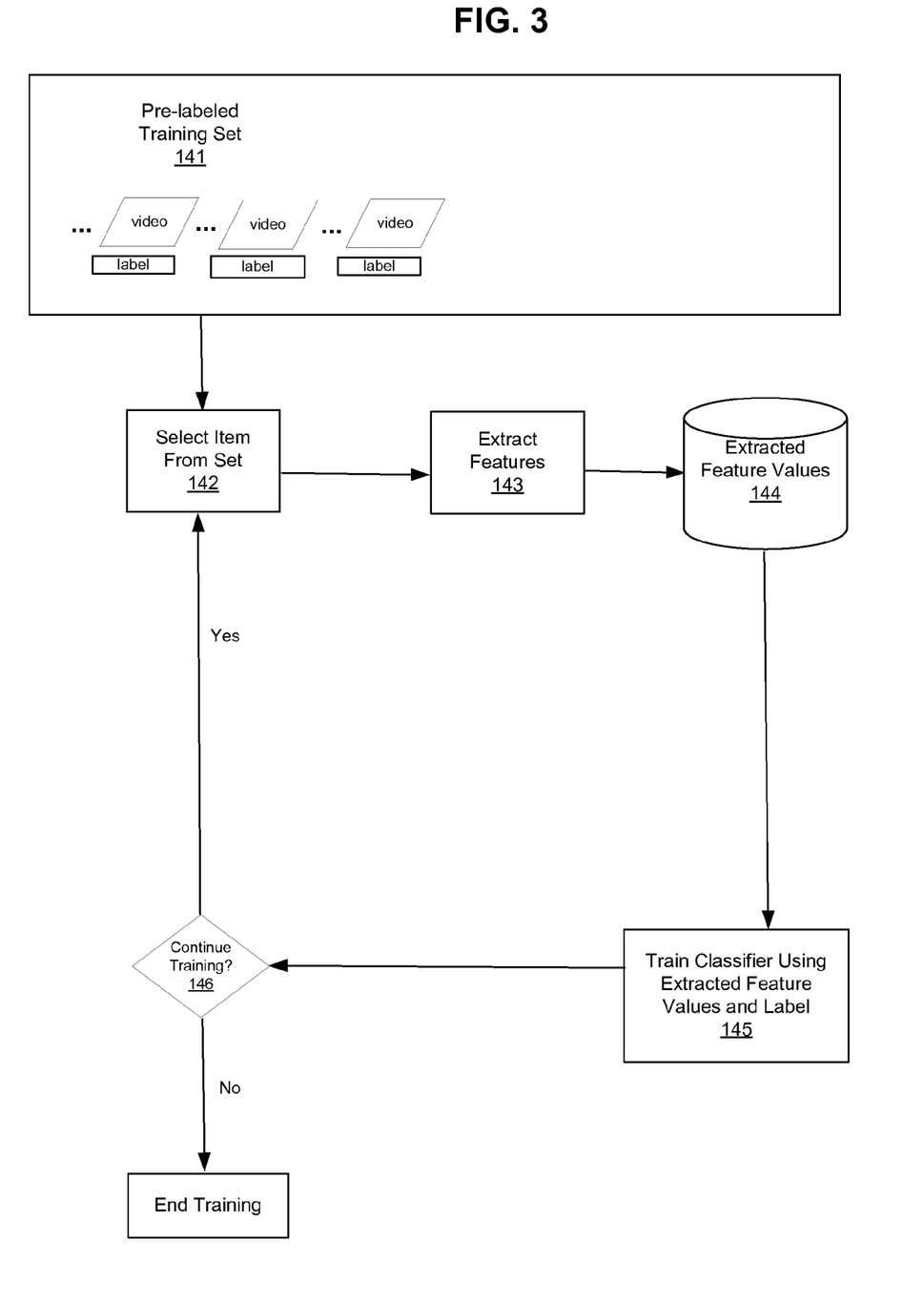
FIG. 3 is a data flow diagram representing the training process for a category classifier within the category classifier training module, according to one embodiment.

FIG. 3 illustrates the process of training the category classifier 117. An embodiment of the category classifier training module 118 may use a process like this, or the training module 118 may use another appropriate training algorithm.

In one embodiment of the category classifier training module 118, the pre-labeled training set 141 comprises selected videos that are deemed to contain content of the desired category and that are labeled as such. These are known as positive training samples. For example, a set of videos which are each labeled as "cover songs" can be used as inputs for the category classifier training module 118 to learn to identify musical performance content that contains covers of known songs. As another example, a set of videos which are each labeled "comedy routine" can be used as inputs for the category classifier training module 118 to learn to identify stand-up comedy routines. The training algorithm may also take negative training samples, i.e. videos deemed to contain no content of the desired category, and that are labeled as such.

Videos from the pre-labeled training set 141 are selected 142, and features are extracted 143 to obtain a set of features values for the video 144. Various types of features can be extracted from the training set videos. Useful features include audio spectrogram, hue-saturation histogram computed per frame, shot boundary, audio volume, histogram-based motion estimation, mel-frequency cepstral coefficients, stabilized auditory image (SAI), SAI intervalgram audio features, per-frame histogram of gradients (HOG), and HOG/RAW cuboids. One skilled in the field could include other appropriate features for extraction, such as features used for detection of adult content, and features extracted from text metadata such as comments, tags, and subtitles.

Once the desired features are extracted from the videos, the extracted features and the associated category label are used to train 145 the category classifier 117. In the training stage 145, the classifier is adjusted to take into account the features of the known training item. The details of the training 145 process may vary based on the classification algorithm used in the training.

The decision 146 to halt the training process can depend on the size of the training set, the rate of improvement of the classifier's accuracy (or the lack thereof), or any other relevant factor such as time or computing resources consumed.

The pre-labeled training set 141, is a set of videos that have been pre-screened to ensure that they are accurately labeled, in order to provide a training sample for the classifier training process. In some embodiments the pre-labeled training set 141 is assembled through manual selection and labeling. In other embodiments an automatic process is used. For example, when training a category classifier to identify amateur musical content, a set of training videos containing amateur musical content can be obtained by selecting videos that are present in user playlists that have names containing the string "cover songs." This set of videos can then be used as the pre-labeled training set 141 to train the category classifier that can automatically identify videos containing amateur music content.

Human Rating Module

The embodiment of the video rating module 109 illustrated in FIG. 2 also comprises a human rating module 120. The human rating module 120 takes the set of videos of a selected category, identified by the video identification module 119, and associates it with human preference data gathered from human viewers.

Figure 4:
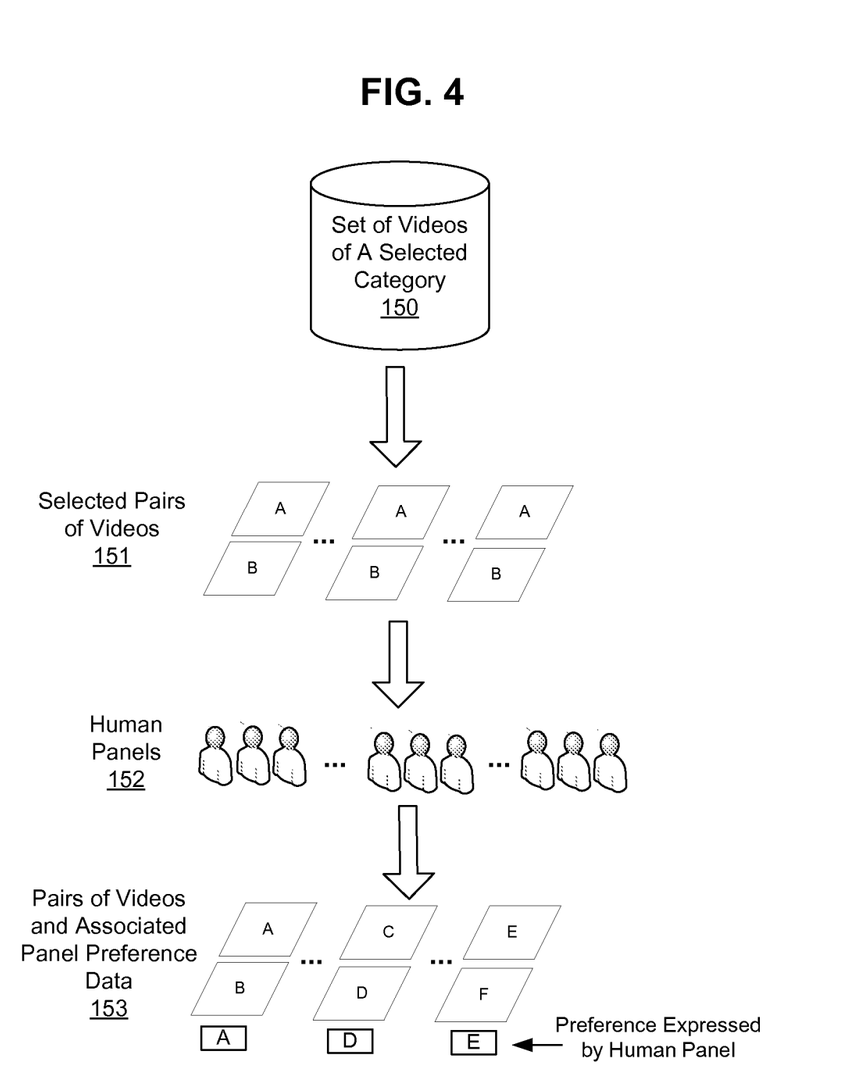
FIG. 4 is a data flow diagram illustrating the human rating process within the human rating module, according to one embodiment.

FIG. 4 illustrates one embodiment of the process of gathering human preference data in the human rating module 120. In this embodiment, the set of videos of a selected category 150 identified by the video identification module 119, is organized into selected tuples of videos 151 by the human rating module 120. The arrangement of the tuples can be such that each video appears in only a single tuple, or alternatively, videos may be allowed to appear in multiple separate tuples. In the embodiment illustrated in FIG. 4, each tuple contains two (a pair) of videos. This embodiment is further described, but the operations discussed here can be readily extended to tuples of three or more videos.

The rating module 120 then presents the video pairs to a plurality of panels 152 of human viewers, and obtains preference data 153 in response to each presentation. Each pair may be submitted to only a single panel, or alternatively to multiple panels. In the embodiment illustrated in FIG. 4 there are three human raters on each panel, but other embodiments can use two or more humans.

The human panels 152 view the pair of videos. In one embodiment, each viewer in a panel 152 provides a rating to at least one of the videos, such that the combined ratings of the all members of the panels allows identification of the preferred or better videos in terms of content quality (e.g., quality of musical content, comedic content, dramatic content, etc.). The ratings can be singular votes, numerical scores, categorical values (e.g., "Thumbs Up," "Thumbs Down"), or the like. In embodiments where the tuples contain more than two videos, the ratings can take the form of a ranking of the videos in the tuple by each member of a panel that is rating that tuple.

The ratings provided by the human viewers are used to determine the preference data 153. As will be appreciated, in practice not every panel may end up rating the videos in a tuple, in which case the tuple can be either reused, or discarded.

In a panel of three viewers (or more generally, any odd number of viewers), where each viewer providing a single vote, one video will always have the majority vote. In one embodiment where the tuples are pairs, the video having the majority vote is identified as the preferred video (conveniently called the "winner" or "winning video"). In another embodiment, a video is identified as the winning video only if it has a unanimous vote from the panel. In yet another embodiment, where panels include four or more viewers, a supermajority (e.g., 3 out of 4, or 4 out of 5) may be used.

In embodiments using categorical values (e.g. "Thumbs Up," "Thumbs Down") the preferred video(s) in each tuple can be identified by determining which videos have the most ratings of a particular categorical value (e.g. videos with the most "Thumbs Up" ratings).

In embodiments where there are more than two videos in each tuple, and where the ratings are in the form of rankings, the preferred videos are identified by combining the rankings of the panel viewers.

In the embodiment illustrated in FIG. 4, the human rating module 120 receives and compiles the ratings from each panel for each video pair into preference data 153. The preference data can be the ratings themselves, as well as additional information. As illustrated, the data captured includes an identification of the video in the pair of videos that was preferred (e.g., highest rated, majority vote) by the human raters on the panel. The identity of the non-preferred video (conveniently referred to as the "losing video") is also captured. Other data that can be included in the captured data 153 include demographic information about each panel member, and the amount of time taken by each panel member to select their preferred video.

In one embodiment the human rating module 120 additionally allows the human raters 152 to indicate that one or more videos that have been viewed by them are "invalid" or "unrelated" to the selected category. This information may be used to remove unrelated or invalid videos from the set of videos identified by the video identification classifier 150. The identified invalid or unrelated videos may additionally be used as negative training samples in future training of the category classifier 117.

Scoring Module

The video tuples (e.g., pairs) and associated panel preference data 153 are used by the scoring module 121 to construct a training set, illustrated in FIG. 2, to train the rating classifier in the rating classifier training module 122. Given an input video, the trained rating classifier 123 operates on features extracted from the video to automatically produce a numeric score that is correlated with the preferences exhibited by the human viewers with regards to the content in the training set videos, as collected by the human rating module 120.

Figure 5:
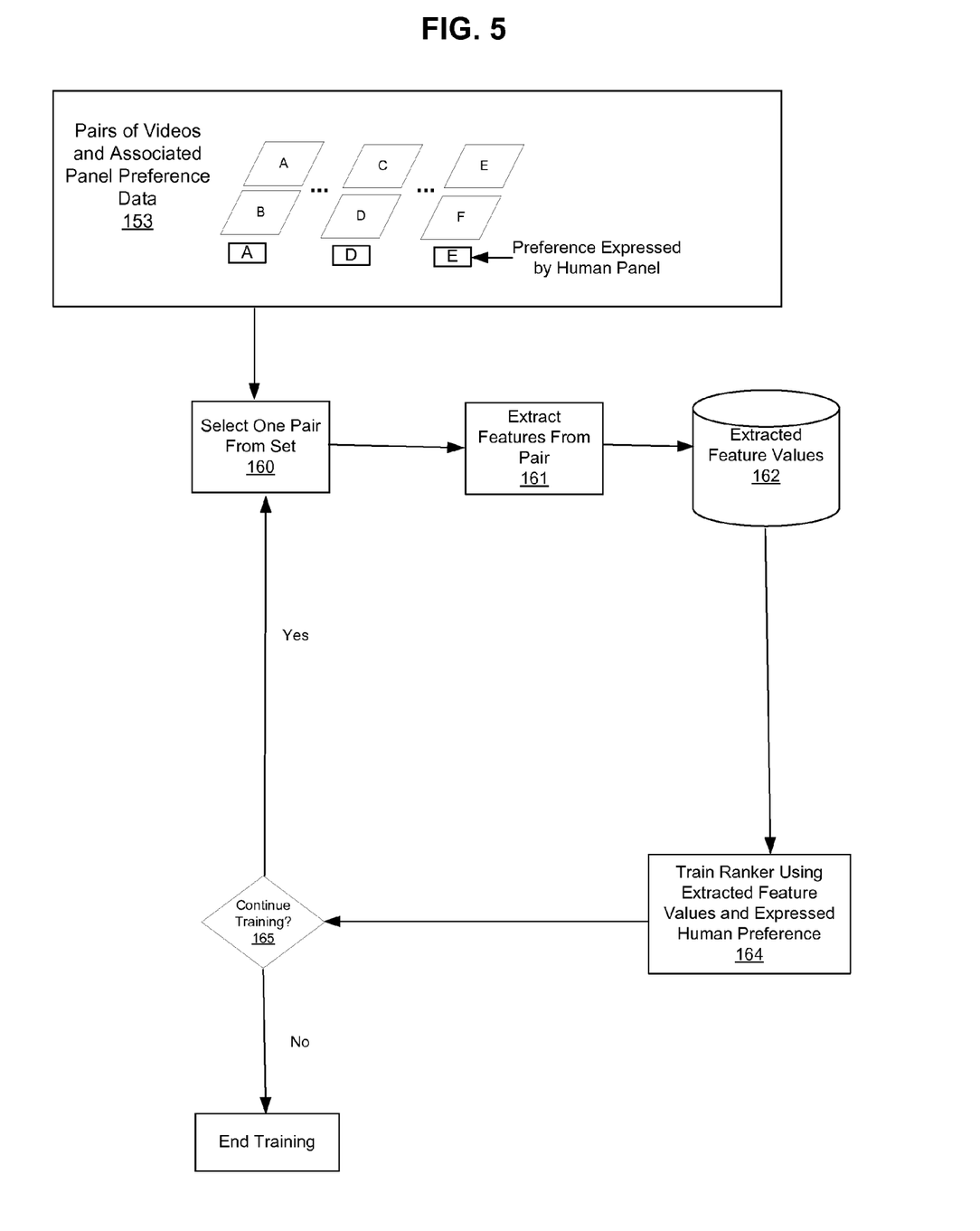
FIG. 5 is a data flow diagram representing the training process for a rating classifier within the rating classifier training module, according to one embodiment.

The rating classifier 123 may be trained using a machine learned process as illustrated in FIG. 5, or any other machine learned process that would be known to one skilled in the art. Different embodiments may use different machine learned algorithms. Machine learned classification algorithms can be used as well as suitable machine learned ranking algorithms, including the Kernel PAMIR ranker (Grangier, Bengio, "A Discriminative Kernel-based Model to Rank Images from Text Queries," IEEE Transactions on Pattern Analysis), RankingSVM (Herbich et al., "Large Margin Rank Boundaries for Ordinal Regression," Microsoft Research), Rank-Boost (Freund et al., "An Efficient Boosting Algorithm for Combining Preferences," Journal of Machine Learning Research), AdaRank (Xu, Li, "AdaRank: A Boosting Algorithm for Information Retrieval", SIGIR 2007 Proceedings), and the like. One skilled in the art will find different machine learned algorithms appropriate based on the details of the training process and the training set.

The machine learned process illustrated in FIG. 5 uses the video tuples and the associated panel preference data 153 from the human rating module as the training set. As mentioned above, the panel preference data 153 can take many forms. In the illustrated embodiment the panel preference data comprises metadata indicating the preferred video in each pair (which can also indicate the losing video).

This training data is selected one tuple at a time 160 and features are extracted from at least the most preferred video 161 in the tuple (e.g., the winning video), and optionally one or more of the non-preferred video(s). For example, where the tuples are pairs, features are extracted from both the winning and losing videos; where the tuples are 3-tuples, features can be extracted from the most preferred video and the two less preferred videos. In another embodiment, features are extracted only from the most preferred (e.g., the winning) video in each tuple. The features extracted from the videos at this stage can be the same features that were extracted during the classifier training process 144 described above (FIG. 3) or they can be a subset or superset of these features, or an entirely different set of features altogether. If there is an overlap between the features 162 used to train the rating classifier 123 and the features 144 used to train the category classifier 117, then those features can be extracted once and used for both processes.

Once the desired features are extracted from the video pairs, the extracted features and the associated human panel preference data are used to train 164 the rating classifier 123. In the training stage 164, the rating classifier 123 is trained to recognize the features which distinguish winning videos from losing videos, i.e. the features which distinguish videos preferred by human viewers from videos not preferred by human viewers. The details of the training 164 process may vary based on the machine learned algorithm used in the training.

The decision 165 to halt the training process can depend on the size of the training set, the rate of improvement of the rating classifier's accuracy (or the lack thereof), or any other relevant factor such as time or computing resources consumed.

Once the rating classifier 123 has been trained it can be used to automatically generate a numeric score (equivalently rating, ranking score or ranking value) for any video, based on the features of the video. The rating can be understood as a rating of the quality of content, closely approximating how the video would be rated by human viewers. If scores are generated for a set of videos, then the videos can be ranked (ordered) according to their ratings/scores, from highest to lowest rating/score, which approximates the results of a ranking of such videos as would be performed by human viewers.

Applications

The output of the video rating module 109 can be used by other systems in the video hosting service 100. For example, in one embodiment, the video rating module 109 is used to rank videos identified in a response to a search query. More specifically the video search module 106 receives a query term from a user, and identifies a set of videos responsive to the query. The set of videos is provided to the scoring module 121, which generates a rating for each video in the search result set using the rating classifier 123. The video search module 106 can use the ratings for the videos as a factor for ordering (sorting) the search results, for example to give preference (e.g., a high placement in search result listing) to search results that are highly rated. For example, a user submits the search query "Michael Jackson Cover Songs" to video search module 106. A set of videos responsive to the query is provided to the scoring module 121. A previously trained rating classifier 123, which is capable of rating cover songs, is used to generate a rating for each video in the set. The video search module 106 uses the ratings along with other factors (such as view count, recommendations, etc.) to determine an ordering of the search results such that the user is presented with the most relevant list of Michael Jackson cover songs.

In another embodiment, the video rating module 109 can be used to identify "top videos" in a particular category. The video identification module 119 identifies videos in video repository 116 that are of the desired category. The category videos may be identified manually by user labeling, or they may identified by an automated system that uses the category classifier 117 to automatically identify videos in the category. The identified videos of the category, from the video repository 116, are rated by an embodiment of the rating classifier 123 that has been trained to rate videos of that content category. Then the scoring module 121 ranks the videos by their rating and identifies the top videos for presentation to users. For example, in one embodiment, the video identification module 119 identifies videos in video repository 116 that are amateur music performances like cover songs, by using an embodiment of category classifier 117 that is trained to identify such cover songs. Next, an embodiment of rating classifier 123 is trained to rate this amateur musical content. Then the scoring module 121 ranks a large collection, e.g., 1000, or even 100,000 videos of amateur musical content, and identifies from this large collection the 25 top scoring videos which are then presented to viewers as the "Top 25 Amateur Cover Songs."

As a further extension of this embodiment, the set of top content videos can be provided to a population of users of the video hosting service 100, where each such user can vote on the videos, for example by picking one or more of the videos as their favorites, or providing individual ratings to one or more of the videos. The ratings can then be aggregated to readily identify talented performers, for example by identifying the video with the highest number (or value) of user ratings. This approach is much faster and more reliable than if viewers had to individually rate the input collection of video. As yet a further extension, the output of this user rating, that is the top user-rated videos selected out of the top machine-rated videos, can be fed back into the rating classifier training module 122 to improve the quality of the rating classifier 123.

The present application has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement various embodiments or features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of various embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of various embodiments include process steps and instructions described herein in the form of an algorithm. It should be noted that the process steps and instructions of an embodiment could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for purposes of enablement and disclosure of best mode.

Various embodiments are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the present disclosure is intended to be illustrative, but not limiting, in scope, which is set forth in the following claims.

What is claimed is:

1. A computer-implemented method for training a machine learned rating classifier for rating the content quality of videos, the method comprising:
   receiving from a plurality of panels of human viewers, ratings associated with a plurality of tuples of videos of a selected category, the ratings indicating preferences of the human viewers for videos in the tuples;
   determining from the ratings, preferred videos in the tuples of videos, wherein each tuple has at least one preferred video selected responsive to the indicated preferences of the human viewers;
   creating a training set of training videos from the preferred videos in the tuples of videos; and
   training the machine learned rating classifier using the training set, the rating classifier configured to determine a rating of content quality of an unrated video of the selected category based on a correlation of the unrated video with the ratings associated with the plurality of tuples of videos of the selected category.

2. The method of claim 1, wherein the videos of the selected category are automatically identified using a machine learned category classifier.

3. The method of claim 2, wherein the category classifier uses an Adaptive Boosting algorithm.

4. The method of claim 2, wherein the category classifier is trained to identify videos of the selected category by using a training set of videos from user playlists that are identified as being associated with the selected category.

5. The method of claim 1, wherein the videos of the selected category are identified by providing a search query, comprising the selected category, to a search engine, and including videos in search results responsive to the query in the selected category.

6. The method of claim 1, wherein the rating classifier comprises a Kernel PAMIR machine learned ranker.

7. The method of claim 1, wherein the ratings associated with the plurality of tuples of videos are produced by providing the same tuple to no more than one panel.

8. The method of claim 1, wherein the ratings associated with the plurality of tuples of videos are produced by providing at least one tuple of videos to more than one panel.

9. The method of claim 1, wherein the ratings associated with the plurality of tuples of videos further comprise a ranking of the videos in each tuple.

10. The method of claim 1, wherein the ratings associated with the plurality of tuples of videos further comprise one or more votes for each human viewer on a panel of the plurality of panels of human viewers.

11. The method of claim 1, wherein the ratings associated with the plurality of tuples of videos further comprise a numerical score for one or more videos in each tuple.

12. The method of claim 1, wherein the ratings associated with the plurality of tuples of videos further comprise a categorical value for one or more videos in each tuple.

13. A computer implemented method of rating the content quality of content in videos comprising:
   submitting a plurality of unrated videos of a selected category to a machine learned rating classifier, the machine learned rating classifier trained using a training set of videos in the selected category, the training set generated from a plurality of tuples of videos of the selected category and ratings associated with the plurality of tuples of videos of the selected category provided by a plurality of panels of human viewers, the ratings indicating preferences of the human viewers for videos in the tuples;
   using the rating classifier to automatically generate a rating of content quality for each of the unrated videos of the selected category, the rating of content quality of an unrated video based on a correlation of the unrated video with the ratings associated with the plurality of tuples of videos in the selected category;
   making a list of the plurality of videos of the selected category that were rated by the machine learned rating classifier;
   using the generated ratings of the videos in the list to order the list; and
   using the ordered list to provide users of a video hosting service with a selection of videos to view.

14. A computer system for automatically rating videos of a selected category, the system comprising:
   one or more computer processors;
   rating software instructions executing on the one or more processors, for receiving ratings associated with a plurality of tuples of videos of the selected category from a plurality of panels of human viewers, wherein the ratings indicate preferences of the human viewers for videos in the tuples;
   scoring software instructions executing on the one or more processors, for (1) training a machine learned rating classifier using a training set of training videos of the selected category, the training set created from preferred videos in the tuples of videos selected responsive to the indicated preferences of the human viewers, (2) submitting a set of one or more unrated videos of the selected category to the machine learned rating classifier, (3) automatically generating a rating for each of the one or more unrated videos in the set to produce a set of rated videos, the rating of a rated video based on a correlation of the rated video with the ratings associated with the plurality of tuples of videos of the selected category, (4) ordering the videos in the set of rated videos using the ratings, (5) providing users of a video hosting service with a selection of videos to view based on the ordering of the videos in the set of rated videos.

15. The system of claim 14, wherein the videos of the selected category are automatically identified using a machine learned category classifier.

16. The system of claim 15, wherein the category classifier uses an Adaptive Boosting algorithm.

17. The system of claim 15, wherein the category classifier is trained to identify videos of the selected category by using a training set of videos from user playlists that are identified as being associated with the selected category.

18. The system of claim 14, wherein the videos of the selected category are identified by providing a search query, comprising the selected category, to a search engine, and including videos in search results responsive to the query in the selected category.

19. The system of claim 14, wherein the rating classifier comprises a Kernel PAMIR machine learned ranker.

20. The system of claim 14, wherein the ratings of the tuples of videos are produced by providing the same tuple of videos to no more than one panel.

21. The system of claim 14, wherein the ratings associated with the plurality of tuples of videos are produced by providing at least one tuple videos to more than one panel.

22. The system of claim 14, wherein the ratings associated with the plurality of tuples of videos further comprise a ranking of the videos in each tuple.

23. The system of claim 14, wherein the ratings associated with the plurality of tuples of videos further comprise one or more votes for each human viewer on a panel of the plurality of panels of human viewers.

24. The system of claim 14, wherein the ratings associated with the plurality of tuples of videos further comprise a numerical score for one or more videos in each tuple.

25. The system of claim 14, wherein the ratings associated with the plurality of tuples of videos further comprise a categorical value for one or more videos in each tuple.

26. An apparatus comprising a non-transitory computer-readable medium having executable instructions encoded thereon that, in response to execution by a computing device, cause the computing device to perform operations comprising:

receiving from a plurality of panels of human viewers, ratings associated with a plurality of tuples of videos of a selected category, the ratings indicating preferences of the human viewers for videos in the tuples;

determining from the ratings, preferred videos in the tuples of videos, wherein each tuple has at least one preferred video selected responsive to the indicated preferences of the human viewers;

creating a training set of training videos from the preferred videos in the tuples of videos; and training the machine learned rating classifier using the training set, the rating classifier configured to determine a rating of content quality of an unrated video of the selected category based on a correlation of the unrated video with the ratings associated with the plurality of tuples of videos of the selected category.

27. The apparatus of claim 26, wherein the videos of the selected category are automatically identified using a machine learned category classifier.

28. The apparatus of claim 27, wherein the category classifier uses an Adaptive Boosting algorithm.

29. The apparatus of claim 27, wherein the category classifier is trained to identify videos of the selected category by using a training set of videos from user playlists that are identified as being associated with the selected category.

30. The apparatus of claim 26, wherein the videos of the selected category are identified by providing a search query, comprising the selected category, to a search engine, and including videos in search results responsive to the query in the selected category.

31. The apparatus of claim 26, wherein the rating classifier comprises a Kernel PAMIR machine learned ranker.

32. The apparatus of claim 26, wherein the ratings associated with the plurality of tuples of videos are produced by providing the same tuple to no more than one panel.

33. The apparatus of claim 26, wherein the ratings associated with the plurality of tuples of videos are produced by providing at least one tuple of videos to more than one panel.

34. The apparatus of claim 26, wherein the ratings associated with the plurality of tuples of videos further comprise a ranking of the videos in each tuple.

35. The method of claim 1, wherein the rating classifier is further configured to learn content features from each tuple of videos that are correlated positively or negatively with the preferences of the human viewers.

36. The method of claim 35, wherein the rating classifier determines the rating of content quality of the unrated video based on a correlation of content features of the unrated video with the learned content features that are correlated positively or negatively with the preferences of the human viewers.

* * * * *